(12) United States Patent
Larin et al.

(10) Patent No.: US 10,133,560 B2
(45) Date of Patent: Nov. 20, 2018

(54) LINK TIME PROGRAM OPTIMIZATION IN PRESENCE OF A LINKER SCRIPT

(71) Applicant: Qualcomm Innovation Center, Inc., San Diego, CA (US)

(72) Inventors: Sergei Larin, Austin, TX (US); Shankar Kalpathi Easwaran, Austin, TX (US); Hemant Kulkarni, Cedar Park, TX (US); Tobias Edler Von Koch, Austin, TX (US)

(73) Assignee: QUALCOMM Innovation Center, Inc., San Diego, CA (US)

( * ) Notice: Subject to any disclaimer, the term of this patent is extended or adjusted under 35 U.S.C. 154(b) by 37 days.

(21) Appl. No.: 15/273,527

(22) Filed: Sep. 22, 2016

(65) Prior Publication Data

US 2018/0081650 A1   Mar. 22, 2018

(51) Int. Cl.
*G06F 8/41* (2018.01)
*G06F 8/54* (2018.01)

(52) U.S. Cl.
CPC ............... *G06F 8/443* (2013.01); *G06F 8/54* (2013.01); *G06F 8/427* (2013.01)

(58) Field of Classification Search
CPC .......... G06F 8/41–8/54; G06F 9/44521; G06F 17/2705; G06F 17/271
USPC ................................................. 717/140–167
See application file for complete search history.

(56) References Cited

U.S. PATENT DOCUMENTS

| 7,356,813 | B2* | 4/2008 | Liu | G06F 8/433 |
| | | | | 717/154 |
| 7,814,467 | B2* | 10/2010 | Li | G06F 8/443 |
| | | | | 717/136 |
| 8,468,516 | B1* | 6/2013 | Chen | G06F 8/67 |
| | | | | 707/687 |

(Continued)

OTHER PUBLICATIONS

Levine, J. R., Linkers & Loaders, Morgan Kaufmann, 1999, pp. 12-14, 74-75, 136-138, 164 and 282-284, [retrieved on Dec. 6, 2017], Retrieved from the Internet: <URL:https://pdfs.semanticscholar.org/6a01/2a232faa0b885e8c45a1775d16ddc02b5680.pdf>.*

(Continued)

*Primary Examiner* — Geoffrey R St Leger
(74) *Attorney, Agent, or Firm* — Neugeboren O'Dowd PC

(57) ABSTRACT

A method for optimizing source code comprises optimizing the source code of files from a computer program at link-time, and receiving, at a linker, a customized linker script defining output sections for files of an executable version of the files of the computer program. The method comprises adding, to intermediate representation files having global or local symbols, metadata comprising default section assignment information for the symbols and recording, for symbols in machine code files, an origin path and an output section. The method further comprises parsing, by the compiler, the intermediate representation files, recording the symbols and related symbol information comprising default section assignment and dependency information of the intermediate representation files, assigning output sections to the symbols based on the default section assignments and instructions from the customized linker script, and linking optimized code of the files of the computer program based on the assigned output sections.

20 Claims, 7 Drawing Sheets

(56) References Cited

U.S. PATENT DOCUMENTS

| | | | | |
|---|---|---|---|---|
| 8,689,197 | B2* | 4/2014 | Edwards | G06F 8/54 711/125 |
| 9,442,707 | B2* | 9/2016 | Sathyanathan | G06F 8/41 |
| 9,558,096 | B2* | 1/2017 | Huang | G06F 11/3409 |
| 9,569,185 | B2* | 2/2017 | Wuerthinger | |
| 9,575,780 | B2* | 2/2017 | Liu | G06F 8/71 |
| 2004/0064809 | A1* | 4/2004 | Liu | G06F 8/433 717/158 |
| 2005/0125783 | A1* | 6/2005 | Tatge | G06F 8/443 717/152 |
| 2005/0160058 | A1* | 7/2005 | Li | G06F 8/443 |
| 2010/0088688 | A1* | 4/2010 | Edwards | G06F 8/4442 717/151 |
| 2015/0040109 | A1* | 2/2015 | Liu | G06F 8/71 717/140 |
| 2015/0227351 | A1* | 8/2015 | Wuerthinger | G06F 8/443 717/139 |
| 2015/0269052 | A1* | 9/2015 | Huang | G06F 11/3409 717/140 |
| 2015/0294114 | A1* | 10/2015 | Monahan | G06F 8/41 726/26 |
| 2015/0378697 | A1* | 12/2015 | Sathyanathan | G06F 8/41 717/146 |
| 2017/0017472 | A1* | 1/2017 | He | G06F 8/41 |

OTHER PUBLICATIONS

Creating a linker script, Xilinx, 2013, 2 pages, [retrieved on Dec. 20, 2017], Retrieved from the Internet: <URL:http://www.xilinx.com/support/documentation/sw_manuals/xilinx14_5/SDK_Doc/tasks/sdk_t_create_lscript.htm>.*

Cilio, A. G. M., et al., A Linker for Effective Whole-Program Optimizations, International Conference on High-Performance Computing and Networking, 1999, pp. 643-652, [retrieved on Aug. 21, 2018], Retrieved from the Internet: <URL:https://link.springer.com/content/pdf/10.1007%2FBFb0100625.pdf>.*

Von Platen, C., et al., Feedback linking: optimizing object code layout for updates, Proceedings of the 2006 ACM SIGPLAN/SIGBED conference on Language, compilers, and tool support for embedded systems, 2006, pp. 2-11, [retrieved on Aug. 28, 2018], Retrieved from the Internet: <URL:http://dl.acm.org/>.*

* cited by examiner

LINK TIME PROGRAM OPTIMIZATION IN
PRESENCE OF A LINKER SCRIPT

FIELD OF THE DISCLOSURE

The present disclosure relates generally to compilers that compile high-level code to machine code, and more specifically, to link time optimization.

BACKGROUND

In general, a compiler is a computer software program that transforms high-level computer programming code, such as source code written in a human-readable language (e.g. C, C++), into lower-level assembly or machine code (e.g., binary). Compilers utilize various optimization techniques in order to improve the performance of the resulting executable. In general, optimization allows a program to be executed more rapidly or utilize fewer resources. Link time optimization (LTO) is a powerful compilation technique typically utilized in general computing environments, such desktop computers, that allows the broadening of the optimization scope in programming languages that otherwise compile a program one file at a time. That is, the optimization scope can be broadened so that the compiler can compile and optimize more than one file at a time. LTO utilizes a computer program (i.e., a utility) known as a linker, which links together multiple files of a source program, once optimized by the compiler, to a final executable comprising distinct sections of binary code.

A linker script is another utility used in conjunction with a linker, often in embedded application environments. It is used to express a fine degree of control over the final executable image—and namely, the particular sections thereof—produced during the compilation (and optimization) process. Often, though, if a user tries to use a linker script in an LTO environment, the linker utilized in LTO and the linker script itself come into conflict, which makes the two techniques virtually incompatible. Therefore, a need exists to resolve conflicts between these techniques in order to improve compilation and optimization.

SUMMARY

An aspect of the present disclosure provides a method for optimizing source code. The method may comprise optimizing, at a compiler, the source code of files of a computer program at link-time, and receiving, at a linker, a customized linker script defining output sections for files of an executable version of the files of the computer program. The method may then comprise adding, to intermediate representation files having global or local symbols, metadata comprising default section assignment information for the symbols, recording, for symbols in machine code files, an origin path and an output section, and parsing, by the compiler, the intermediate representation files. Then, the method may include recording the symbols and related symbol information comprising default section assignment and dependency information of the intermediate representation files, and then assigning output sections to the symbols based on the default section assignments and instructions from the customized linker script. The method may then comprise linking optimized code of the files of the computer program based on the assigned output sections.

Another aspect of the disclosure provides a system for optimizing source code. The system may comprise a linker and a compiler arranged in a link-time optimization tool flow to produce an link-time optimized executable computer program; a customized linker script that instructs the linker how to arrange output sections in the link-time optimized executable computer program; and an application program interface that enables communication between the linker and compiler and configured to facilitate the arrangement of the output sections of the link-time optimized executable according to the customized linker script. The linker, compiler, and application program interface may be configured to perform a method comprising optimizing, at a compiler, the source code of files of a computer program at link-time, and receiving, at a linker, a customized linker script defining output sections for files of an executable version of the files of the computer program. The method may then comprise adding, to intermediate representation files having global or local symbols, metadata comprising default section assignment information for the symbols, recording, for symbols in machine code files, an origin path and an output section, and parsing, by the compiler, the intermediate representation files. Then, the method may include recording the symbols and related symbol information comprising default section assignment and dependency information of the intermediate representation files, and then assigning output sections to the symbols based on the default section assignments and instructions from the customized linker script. The method may then comprise linking optimized code of the files of the computer program based on the assigned output sections.

Yet another aspect of the disclosure provides a non-transitory, computer-readable storage medium configured to perform a method of optimizing source code. The method may comprise optimizing, at a compiler, the source code of files of a computer program at link-time, and receiving, at a linker, a customized linker script defining output sections for files of an executable version of the files of the computer program. The method may then comprise adding, to intermediate representation files having global or local symbols, metadata comprising default section assignment information for the symbols, recording, for symbols in machine code files, an origin path and an output section, and parsing, by the compiler, the intermediate representation files. Then, the method may include recording the symbols and related symbol information comprising default section assignment and dependency information of the intermediate representation files, and then assigning output sections to the symbols based on the default section assignments and instructions from the customized linker script. The method may then comprise linking optimized code of the files of the computer program based on the assigned output sections.

DETAILED DESCRIPTION

Figure 1:
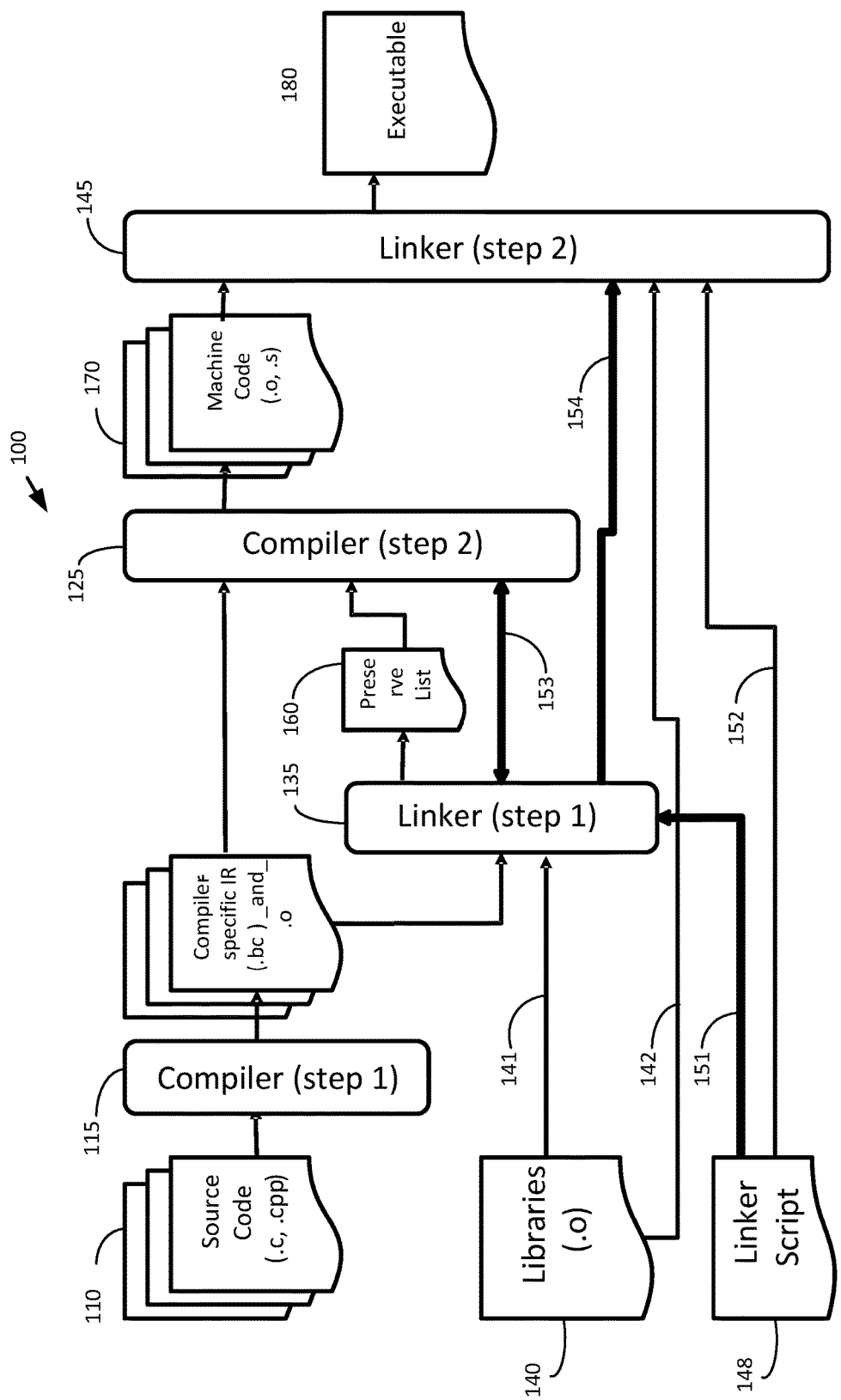
FIG. 1 shows a high-level view of an LTO tool flow in the presence of a linker script.

LTO is a highly desirable optimization methodology because it is powerful and works well in very demanding general purpose development environments. In embedded development environments (such as in smartphones), though, LTO is often not used, due to conflicts that exist between LTO and another development technique known as a customized linker script, which is used in order to allow a developer to exert a fine degree of control of an executable in the embedded environment. It would be beneficial to utilize the optimization potential of LTO in conjunction with the fine degree of executable control that is made possible with a linker script, but the two techniques have heretofore been virtually incompatible.

In environments where a customized linker script is used, the linker itself must submit to demands (i.e., conditions or restrictions) specified by the user/developer of the linker script. In traditional build processes, the linker contains default instructions for how a final executable should be linked and arranged, particularly with regard to executable "output sections." The term "sections," as used in this disclosure, refers to atomic blocks of code as they are dealt with by the linker. The term "output sections" refers to the sections as they ultimately are arranged in the final executable. When linker scripts are customized by embedded application developers, the instructions contained therein override the default instructions of a linker in order to express fine control over the element assignment to sections and layout of the resulting executable binary image. However, actual LTO code generation is performed by compiler, which is agnostic to custom section assignment to be performed by the linker. Because the linker script overrides default linker instructions, the use of the linker script itself makes traditional LTO (as implemented in general purpose environments) incompatible to use. For the purposes of the present disclosure, all references to "linker scripts" may be considered to refer to customized linker scripts, rather than default instructions in a linker, unless otherwise specified. As one example of the kind of control a linker script may exert over compilation, sometimes a linker script is utilized to prepare the linked image of the executable for more post-processing steps after compilation which might violate implicit assumptions commonly made in compiler. This script creates additional restrictions on the compiler beyond the immediate scope of the compilation process.

In compilation processes wherein a compiler and a linker are used together to build an executable without LTO, there is very limited interaction between the compiler and linker. The only real interaction is a simple progression in which the compiler produces object code that is later linked by the linker. In traditional LTO, the linker might undertake initial pre-processing of code and then invoke the compiler again to implement additional optimizations on extended scope. However, this limited interaction between a compiler and a linker must be changed if a LTO and a linker script are both to be utilized in the same build process. Therefore, the present disclosure provides ways for a higher level of interaction between the compiler and linker.

There are several reasons the lack of real communication between the compiler and the linker creates issues in the presence of a linker script. One reason is that the compiler mainly agnostic of the operating system path information associated with the original source file during the build process. Without path information, it is difficult, if not impossible, to use a linker script. It has not traditionally been desirable to maintain path information inside of a compiler, because it is cumbersome and impractical to do so. Making the compilation procedure sensitive to path information would actually change the very nature of the compilation process, so keeping path information during compilation is not an ideal way to gain linker script functionality. Another reason the LTO process inhibits the use of linker scripts is that the compiler is unaware of the further use of objects (e.g., global, local, and common variables, and objects from a separate object library), and as such, might choose to modify some of them as coming from the same scope, even if they do not. A linker script may demand that multiple copies of particular objects exist in different sections of the final executable.

Yet another reason the LTO process is incompatible with a linker script is because the linker is most often expected to perform garbage collection (i.e., the deletion of unused sections) in the final step of executable construction. The compiler in LTO can inadvertently expose an object needed by the linker script to garbage collection because the compiler typically ignores an object's path or linker script properties. It would not be ideal to restrict the compiler from performing these steps (e.g., modifying objects, and hiding path information) because it would result in suboptimal code generation.

Aspects of the present disclosure provide several additional features that can supplement a traditional LTO process. These features may be referred to as communication channels, interfaces, tools, methods and/or utilities, and they allow the components of an LTO process to work together in a way that enables the use of a linker script in conjunction with the LTO build flow. The sum of each of these features may be referred to as the "solution," the "system," or the "method," but many individual features alone may be novel over prior approaches, and should not necessarily be construed to require the presence of each other individual feature of the solution in all implementations. Still, many embodiments of the system will utilize each inventive feature discussed herein.

FIG. 1 is a logical block diagram depicting several aspects of an exemplary embodiment. The diagram depicts a process 100 of compiling and linking received source code to an executable in an LTO build flow in the presence of a linker script. FIG. 1 is a logical diagram and should not be construed to be a hardware diagram. The logical blocks in FIG. 1 may be implemented in software, hardware, firmware, or a combination of hardware, software, and firmware. The process outlined in FIG. 1 may be implemented by a compiler and a linker that interact with each other and with versions of code at particular steps in the process. The compiler and linker may each be thought of as single software programs broken up into steps to show inputs, outputs, and the timing of communication between each program. For ease of reference, a single compiler is depicted as operating at Compiler (step 1) 115 and Compiler (step 2) 125 with Linker (step 1) 135 and Linker (step 2) 145. Throughout the disclosure, the compiler may be referred to interchangeably at its first and second steps as "first/second step of the compiler," "first/second stage of the compilation," "the compiler at step one/two," or "the compiler at stage one/two." The linker may be referred to with similar terminology and reference to the first or second steps or stages.

Figure 2:
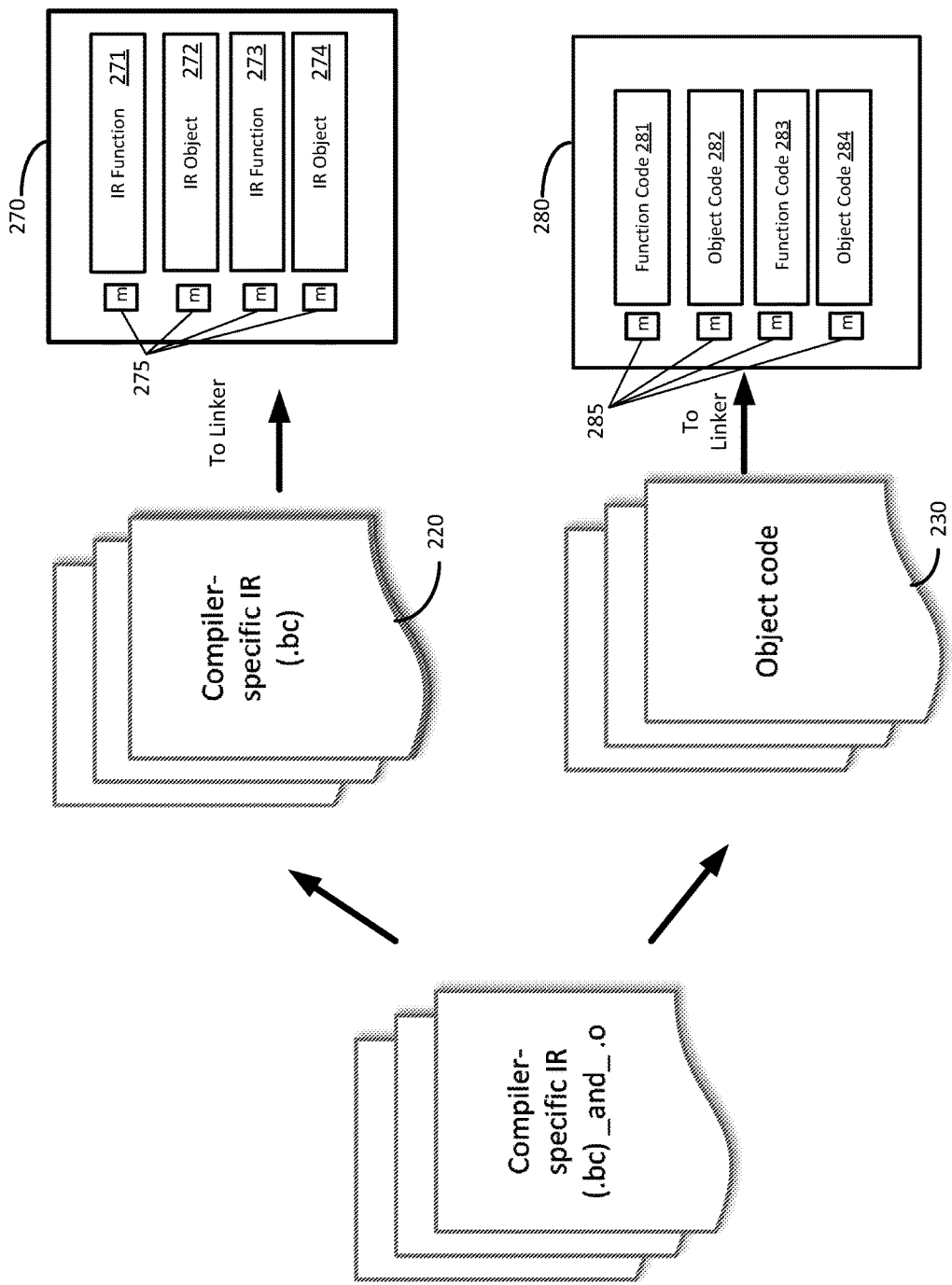
FIG. 2 shows the different types of compiled code produced by a compiler in a first compilation step of an LTO process.

Compiler (step 1) 115 first receives source code 110 of a program. As shown, the source code 110 has example file extensions .c and .cpp, (indicating source code written in C or C++, respectively), but source code may be received in other languages, or may be in a human-readable assembly language. Compiler (step 1) 115 then compiles the source code 110 into two types of files, the first of which being compiler-specific and platform independent intermediate representations (IR, also referred to as internal representation), designated with a .bc (bit code) file extension, and the second of which being platform specific object code (designated with a .o file extension). Compiler (step 1) 115 performs optimizations that are possible at the level of local scope (i.e., one file or one library) and do not yet require information about the global scope (i.e., a whole program). Most optimizations may be performed later, at Compiler (step 2) 125. FIG. 2 shows how these two types of files compiled at Compiler (step 1) 115 are distinct, and turning now to a discussion of their differences will facilitate an understanding of the present disclosure. While discussing the subsequent figures, reference may still be made to the components in FIG. 1.

As mentioned, and as shown in FIG. 2, the compiler at step one 115 can generate either compiler-specific IR code 220 or object code 230. Compiler IR code generation includes platform-specific section name generation for each function and object that will be used at link time. The IR code 220 is often considered "half-baked," or, in other words, incompletely optimized. Generally, a makefile of the program source code will dictate what portion of the code initially gets compiled into IR and what portion gets compiled into object code, based on considerations such as whether parts of the application should be optimized for speed, size, or a combination of these considerations. Though it contains some optimizations that are possible to perform at the local (file) scope, IR code is typically not readable by the linker (or by the processor, for that matter) until it is further compiled to machine code. It is called "compiler-specific" because it is in a form that is readable only to the particular compiler. Compiler (step 1) 115 does also produce some object code 230, which is readable by the linker and ready to be linked. Other aspects of FIG. 2 will be discussed later in the disclosure.

Turning back to FIG. 1, existing libraries 140 are shown as additional inputs to Linker 135, 145 at steps 141 and 142, respectively. These libraries may, for example, be providing standard C functionality in the embedded environment, or may be libraries from an external project. For example, the libraries 140 may include firmware code that is presented to Linker 135, 145 as a library, without additional compilation done to it. The existing library 140 files are designated as .o, because they are present in object code format with all the information needed for linking already present in them.

FIG. 1 also shows a linker script 148 in communication with Linker 135, 145 at interfaces 151 and 152, respectively. As previously discussed, in prior approaches, linker script has been virtually incompatible with LTO flows. The steps that facilitate the linker script support are depicted as interfaces 151, 153, and 154, each of which are highlighted in bold lines. The present disclosure pertains to the functionality of each of these steps, which represent one or more interfaces, communication channels, and/or instructions that allow the linker script to be respected with the LTO tool flow in ways that were not previously available. In particular, the linker script 148 may interact with Linker (step 1) 135 through interface 151, Linker (step 1) 135 may communicate with Compiler (step 2) 125 through interface 153, and Linker (step 1) 135 may communicate with Linker (step 2) 145 through interface 154. The interface 153 comprises an application program interface (API) and allows several pertinent aspects of the solution to be implemented, which will be described in detail through the disclosure. Linker (step 1) 135 generates a "preserve list" 160 to be used by Compiler (step 2) 125, which is also facilitated by the API 153, and which will be described in further detail later in this disclosure. The final steps in the LTO flow 100 depicted are that Compiler (step 2) 125 compiles all the IR and object files into machine code 170, and Linker (step 2) 145 links compiled code from multiple sources to a final executable 180.

Each object file, whether it comes from source code that has been compiled in Compiler (step 1) 115, or from existing object libraries 140, includes global, local and common symbols that represent individual named memory objects. The term "symbols" referred to herein is a blanket term that encompasses both functions (i.e., a sequence of instructions in code that executes) and objects (i.e., a declared variable). After this first step of compilation 125, the rest of the compilation process is strongly dependent on what symbols are used and where they are used. Dependencies of symbols will be discussed throughout the disclosure, but in particular, each symbol is destined to a particular section of the executable. A problem that exists at this step is that Linker (step 1) 135 cannot parse (or read) the compiler-specific IR to be able to tell what symbols those particular IR files include, or whether the symbols are local, global, or common, and as a result, the linker cannot assign output sections early on in the linking process.

Part of the process of compilation is to remove redundancies in code. Both compilers and linkers, by themselves, can remove redundancies. A compiler, in general, can remove redundancies in a number of ways. A linker can typically also remove redundancies in code, but compilers are generally more efficient and nimble in doing so because they have a better understanding of the code. A compiler performs the bulk of the work of identifying redundancies, and then informs the linker of these redundancies, which allows the linker to perform a process known as garbage collection. Garbage collection is essentially the deletion of code that has been identified as redundant by the compiler. In other words, the compiler gathers up the "garbage" and the linker "collects" it. The ability to eliminate code is a main benefit of the compilation process because it reduces the amount of unnecessary code in the executable, making the final executable shorter and faster to process. However, neither the linker nor the compiler should eliminate code at any point in the compilation process that will ultimately be needed in the final executable, and therefore, if neither the compiler nor the linker know whether a particular symbol will be needed, that code will be preserved and not eliminated. In order to ensure that needed code is not eliminated, the linker provides the preserve list 160, in which the linker tells the compiler which symbols it knows of that should be preserved by the compiler. One particular mechanism allows the compiler to more aggressively eliminate code redundancies. Once the preserve list is received by the compiler, all global symbols that are not in the preserve list are recorded and localized to the current module scope. While the process of localization of symbols itself already exists in current compilation processes, localization of global symbols that are not in the preserve list according to the present disclosure allows the compiler to be more aggressive in eliminating redundancies that was previously possible.

As previously discussed, Linker (step 1) 135 cannot read compiler-specific IR, and therefore cannot tell which symbols exist within it. Linkers typically deal with sections, and identify what the linker should do with a particular section (e.g., whether to delete a section, or whether to place the section in a particular part of the output file) based on the symbols in the section. The linker can do this with files that are in object code, but not with files that are in IR. In addition, the compiler itself does not ordinarily keep track of symbols and other symbol information (such as symbol dependencies) within individual files that it is compiling, so it does not typically provide such information to a linker. One aspect of the disclosure is that a new application program interface 153 is created that allows necessary communication between Linker (step 1) and Compiler (step 2) 125 that allows the compiler to assist the linker in identifying symbols within the IR that the compiler has produced, which will be described in further detail presently.

Figure 3:
FIG. 3 depicts how the output sections of an executable in traditional LTO might differ from the output sections of an executable in the presence of a linker script.
Figure 3:
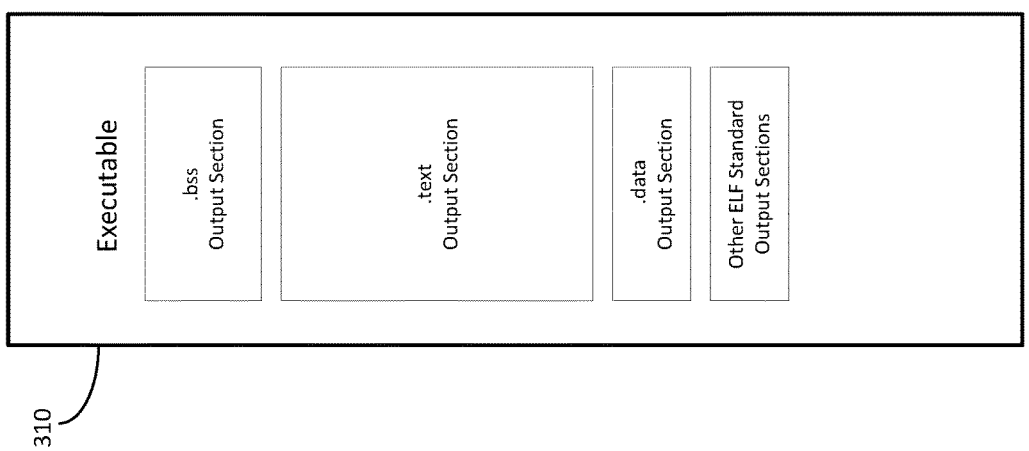

FIG. 3 conceptually illustrates an output format of an executable 310 in traditional LTO without a linker script and an output format of an executable 320 with a linker script, though the examples depicted are greatly simplified for the purposes of illustration. An executable 310 in traditional LTO may have a number of predefined sections, such as a .bss section for uninitialized objects, and a .text section for executable code, and a .data section for memory objects. One standard output format of an executable is known as ELF (Extensible and Linkable Format), and can be used here for illustration purposes on how a typical executable produced by a linker in traditional LTO, such as executable 310, may have around one or two dozen sections. An executable that is produced as the result of linking under direction of a custom linker script, such as executable 320, has sections that are specifically defined by the linker script. These sections likely have different attributes than a typical executable produced by linking in general. Although the linker script-produced executable 320 does not necessarily have to have more sections, in many implementations, the linker script-produced executable 320 will have more sections, sometimes numbering in the thousands. This is because, as will be described later, each function and object of a source code file may be placed in its own individual section as part of the present solution. Therefore, executable 320 is depicted as having many more individual output sections than executable 310.

Figure 4:
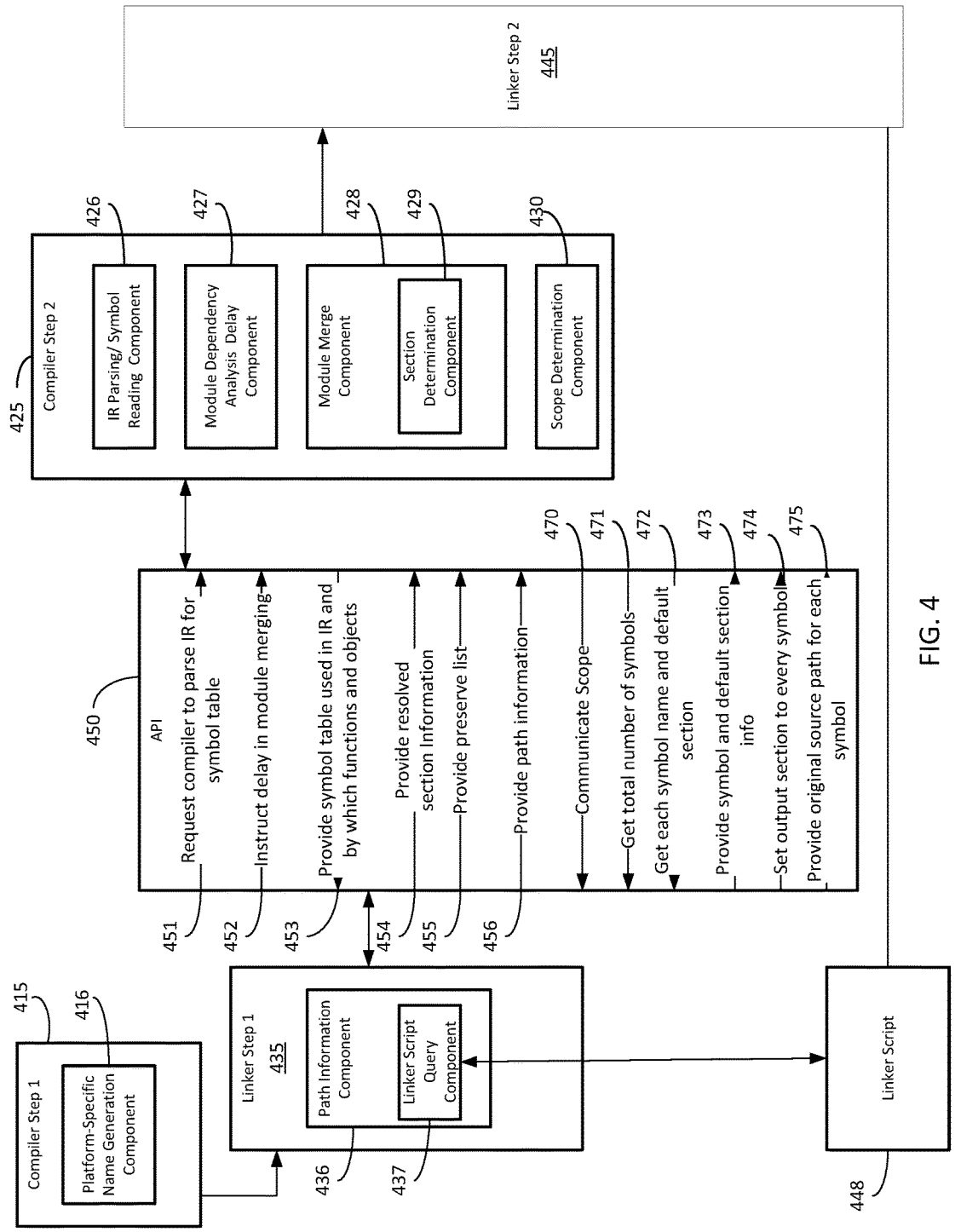
FIG. 4 shows a detailed view of components of the LTO tool flow of FIG. 1, with additional subcomponents of the linker, compiler, and application program interfaces also depicted.

FIG. 4 is a logical block diagram showing several components of the LTO tool flow of FIG. 1 in greater detail. The components depicted in FIG. 4 are not intended to be a hardware diagram, but are intended to show logical steps and connections implemented in software and/or hardware. Certain components that are present in FIG. 1 are omitted from FIG. 4 for the sake of clarity. In one aspect of the disclosure, the solution changes the process of compiler IR code generation to include platform-specific name generation for each function and object destined for LTO. Compiler (step 1) 415 comprises a platform-specific name generation component 416. In existing compilation processes, certain flags are provided in source code (more particularly, in the makefile) for particular functions and objects. Certain types of flags, for example, indicate how a particular function should be optimized more for speed or another one more for size. Other types of flags include "-f-function-sections" flags for functions and "-f-data-sections" for objects. These flags allow the assignment of functions and objects to certain output sections. If there is no such flag, all functions will, for example, be placed in the output section ".txt." However, if a function is flagged with -f-function-section, then the function will be placed in its own specific section, named ".txt.name_of_the_function," for example. The platform-specific name generation results in a particular function or section being named in this manner. The flagging of functions and objects is an existing capability, but it can be used for implementing aspects of the present disclosure. It is one way that each function and object will be put in its own individual section. A compiler itself can delete sections, but this feature of platform-specific name generation is helpful because the linker itself deals with sections, and has the ability to delete sections, but cannot delete functions or objects. As a result of flagging each function and object, each section now has its own name, and may be dealt with more easily by the linker as well as the compiler. Metadata is used (by the compiler) to store the these flags and other information in association with each symbol. It is contemplated that other ways may be used to name individual sections without departing from the scope or the present disclosure Turning back to FIG. 2, which shows how the Compiler (step 1) produces both IR 220 and object code 230, FIG. 2 also illustrates how individual functions and objects may be seen by the linker. IR compilation lines 270 are shown with individual IR functions 271, 273 and individual objects 272, 274 in their own sections. Metadata 275, which is depicted with a small "m," is associated with each function and object, and is used to store information about each. Similarly, object code compilation lines show function code 281 and 283, and object code 282 and 284. Metadata 285 is associated with each function and object in object code as well.

Referring again to FIG. 4, the diagram shows how new features in the LTO tool flow facilitate LTO in the presence of a linker script. One aspect of the disclosure is that an API 450 facilitates communication between the linker at step one 435 and Compiler (step 2) 425. Within the API 450 are several process or method steps, depicted as flowing from either left to right (signifying a communication or request from the linker to compiler) or right to left (signifying a communication or request from compiler to linker). The steps are also depicted in a timing diagram in FIG. 5 to more clearly show the sequence of events between the linker and compiler as depicted here in FIG. 4. Each of these process or method steps may be implemented in an algorithm in the API 450. Though the process or method steps are depicted in a particular order from top to bottom, they are not necessarily implemented in the particular order, and may be implemented simultaneously or in an overlapping manner in actuality.

Depicted within Linker (step 1) 435 and Compiler (step 2) 425 are various logical block components for implementing aspects of the system. In particular, they implement many of the communications and requests depicted in the API 450, as well as other features of the solution. The blocks are logical and are not to be construed as a hardware diagram, and may be implemented by software alone, hardware alone, or a combination of hardware and software.

One aspect of the API 450 is that it allows Linker (step 1) 435 to request that the compiler parse its own IR in order to identify the symbols contained within the IR and def-use (definition and use) relationships between them at step 451. That is, code contained within IR may contain both definitions and uses, but until that IR is parsed, the compiler and linker cannot tell if there are any functions or sections that are not going to be used and could be eliminated. In another aspect, the system API 450 allows the compiler to delay module dependency analysis at step 452. Modules are how calls blocks of code that exist within a particular file are referred to in relation to a compiler and roughly correspond to source code files. During traditional LTO, the linker sends the compiler multiple code modules to be accumulated (or "merged") into the single optimization scope. In traditional LTO, the sending of the multiple code modules to the compiler for merging is beneficial and allows for greater code optimization by the compiler. However, in the present disclosure, the compiler sends the linker parsed IR with symbol information and dependency information about the symbols with each module that is parsed. If dependency analysis were to be performed by the compiler incrementally as modules are received from the linker, the linker would receive dependency information back incrementally as well, which would be incomplete.

As seen in the API 450, at step 453, Compiler (step 2) 425 provides the requested symbol table back to Linker (step 1) 435, which is accomplished by the IR parsing/symbol reading component 326. If the dependency analysis is performed by the compiler as each module is received, then Compiler (step 2) 425 cannot tell Linker (step 1) 435 what symbols are used in IR for the whole scope. Therefore, the present solution provides a module dependency analysis delay component 427, which accumulates pointers to modules in memory in Compiler (step 2) 425 until all of them are available. Once they are all available, then Compiler (step 2) 425 communicates the symbol resolution (i.e., tells the linker what symbols are used where) at step 453. After that, the module merge component 428 of the compiler merges modules.

An additional drawback to analyzing the dependency of modules incrementally (i.e., as they come in), is that path information, which tells Linker (step 2) 445 in what output section to place certain objects and functions, is also lost. For example, when Linker (step 1) 435 receives files, it receives along with it default path information that says what directory the files come from, and what output sections they should ultimately end up in. As stated previously, there may be default instructions in the linker that specify which files should go in which sections, but in the presence of a linker script, the linker script may also contain different rules that specify particular files to go in different output sections than they otherwise would. In traditional LTO, when the linker provides files to the compiler for optimization, the compiler, as previously discussed, typically takes the modules and merges them for compilation. In this merging process, the path information (also known as "source path" information) of where the content of those files should ultimately end up in the output section, is lost.

In the present solution, Linker (step 1) 435 comprises a path information component 436, which has several responsibilities. For one, it memorizes and keeps a list (i.e., records the original source path for each symbol in association with its source module) of the final output section destination for each section. This recording of the original source path for each symbol is necessary for the proper treatment of common symbols at the end of the linking process, which will be discussed in further detail. Additionally, the path information component queries the linker script 448, via a linker script query component 437, to see whether the linker script specifies a particular output section other than a default one.

The API 450 of the present solution also allows the linker to correctly place all sections in the final executable in the present of a linker script. As shown, at step 470, the API allows Compiler (step 2) 425 to communicate the scope of the optimization to Linker (step 1) 435. Then the API 450, allows the linker to "get," at step 471, the total number of symbols per module that were gathered at the previous step and a way to "get," each symbol name and default section information at step 472 and 473. The linker receives the symbol information along with the source path at step 474 to determine the output section for each symbols based on the provided linker script 448. Finally, the linker provides the original source path for each symbol at step 475, in order to ensure that common symbols are treated properly. By performing these steps, the linker ultimately knows, from the combination of symbols, the source path, and the linker script, where to properly place output sections in the final executable.

Linker (step 1) 435 not only provides the information it has about symbols, sections, and path information to Linker (step 2) 445, but it also provides resolved section information to Compiler (step 2) 425, as illustrated in the API 450 at step 454. The compiler keeps this resolved section information along with each object throughout the compilation process.

Additionally, Linker (step 1) 435 provides a preserve list (e.g., preserve list 160 of FIG. 1) at step 455. A challenge to optimization is presented in an LTO flow in the presence of a linker script because it is the responsibility of Linker (step 1) 435 to not only look at the files in the current scope, but to also look at the files outside that scope to determine what symbols are used in other scopes (to ultimately create the final executable). In existing compilation processes, and in the current implementation, Linker (step 1) 135 gathers a list of these knowable symbols, which is known as a preserve list 160, and passes it on to Compiler (step 2) 125. This list informs Compiler (step 2) 125 which symbols can be discarded, and consequently, which code can be deleted. When a linker script is present, as in the implementations shown, the linker script 448 also communicates with Linker (step 1) 435. Both the content of the IR and the linker script are highly influential on the preserve list 160. Because the IR is treated conservatively, very few symbols are left off of the preserve list 160 in case an IR file might need them.

As previously mentioned, one of the tasks a compiler does during compilation in LTO (at Compiler (step 2) is to merge all of the modules together before sending them back to Linker (step 2). Because of the API 450 and the steps of communication facilitated therethrough, Compiler (step 2) 425 is able to gather all functions and objects that might be visible to the linker at the final link stage (at Linker (step two) 445) and log default output section information that is stored in the IR. This gathering of all functions and objects may be done on the level of each individual module so that the module-to-symbol relationship is not lost. Then, Compiler (step 2) 425 merges all modules into a single optimization scope via the module merge component 428. and internalizes symbols with respect to available output section information and the preserve list. This internalization produces different results from existing localization processes.

As a result of the additional communication between the linker and compiler via the APIs, compilation can commence with the use of the additional output section information. In FIG. 4, this is depicted as the section determination component 429 within the module merge component 428, to illustrate that the use of section information by the compiler takes place during the module merge process. Because the compiler now knows what output sections certain functions and objects will ultimately be placed, the compiler can use that information to both restrict and facilitate various compilation decisions. It is contemplated that, in general, that different output sections can be treated differently. When the compiler has this output section information, the compiler can be much more effective at reducing the size of compiler code without an impact on performance. Additionally, more input from a used may be solicited via a linker script to assign various properties to various output sections. These properties might include "hot or cold," performance vs size tradeoff, or even a "firewall requirement that no control flow transfer is possible between certain output sections. Additional input from a user can also allow for improved security features.

At the end of the compilation process, the compiler materializes local variables and functions to their intended output sections, and leaves global and common objects to be placed by Linker (step 2) 445. Linker (step 2) 445 also conducts the final assignment of sections and a final step of garbage collection, resulting in the final executable image.

Figure 5:
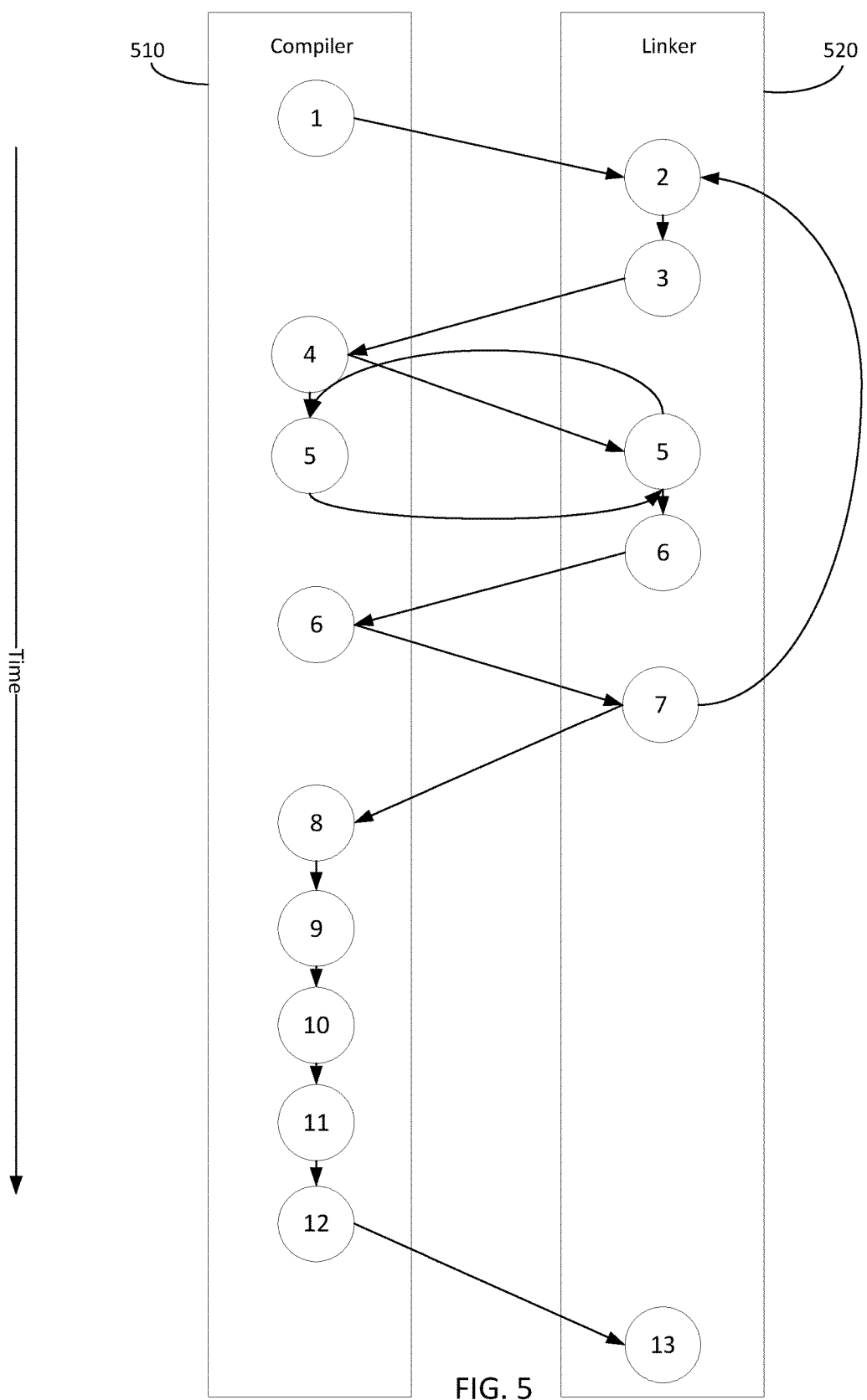
FIG. 5 is a timing diagram of the method of the present disclosure as depicted in FIG. 4.

The overall optimization process of the present disclosure as described in relation to various components of the linker, compiler, and API in FIG. 4 may also be understood by describing the process in terms of timing. FIG. 5 shows a timing diagram with simple linear representations of a compiler 510 and linker 520, with steps 1-13 of the process shown taking place in the linker, compiler, or both in relation to time. The compiler 510 and linker 520 are not depicted as having two separate stages in the way that they are depicted in FIG. 4, but it is to be understood that the functionality described in relation to FIG. 5 is the same as that described in relation to FIG. 4. As such, it is also to be understood that the API (depicted in FIG. 4, but not depicted in FIG. 5) enables the communication between the compiler 510 and the linker 520.

Turning now to each of the steps in FIG. 5, at step 1, the compiler 510 receives a selection of source files (e.g., .c, .cpp, etc.). Based on the makefile of the source code, some of the source files are initially compiled to IR (.bc) and others to object code (.o). Then, according to the method of the present disclosure, for each symbol (i.e., function or object) that is destined to be compiled to IR, the compiler adds metadata containing the symbol's default section assignment.

Next, at step 2, linking begins in the linker 520. The linker 520 receives a selection of compiled files (both in IR and object code) as well as a linker script. For each symbol that is in object code, both their origin path and their output section is recorded, and their dependency information is updated. For each IR file, the origin path is also recorded, but because their output sections and dependencies cannot be read by the linker, the linker requests the compiler to parse the IR. However, before sending the IR and the request back to the compiler, the linker, at step 3, reads the IR file into memory.

Once the linker sends the IR and parsing request to the compiler (as depicted by the arrow between steps 3 and 4), an aspect of the present disclosure is that the compiler, at step 4, receives a memory buffer containing the content of the .bc file (the IR) and reads it as a compiler module. The compiler them parses the content of the module and records information about each symbol. Included in this recorded symbol information is the default section assignment that was initially recorded in the metadata for each symbol in step 1. Another aspect of the disclosure is that dependencies are recorded for each symbol that exists in the IR module. Then, the module is merged with any previously read IR modules. Once parsing is complete, the compiler informs the linker that it is complete, as represented by the arrow between steps 4 and 5. The requesting, parsing, recording, merging, and communicating back to the linker may be facilitated in whole or in part by the API between the compiler 510 and the linker 520.

Step 5 is depicted as taking place at both the compiler 510 and the linker 520. At step 5, the linker 520 actually receives the symbol information that has been parsed and recorded from the compiler 510. Step 6 is also depicted as occurring at both the linker 520 and compiler 510. At step 6, in the linker 520, the linker uses the default section information for all the symbols in IR that were received in step 5. Then, using the linker script, the linker 520 is able to assign output sections to the symbols that were in IR and then inform the compiler about that output section assignment (depicted at compiler 510 step 6). This step allows the fine control of output sections according to the linker script that would not have been possible if the linker 520 did not have the symbol information for IR files. Steps 2-6 may be repeated by the linker 520 and the compiler 510 until all files of the source code are processed.

Once all input files have been processed, and all symbols for both object code and IR have been accounted for, a full dependency graph between all the symbols is available, and the linker can generate a preserve list, which it does at step 7. Then, the linker 520 sends the preserve list to the compiler (as depicted by the arrow between steps 7 and 8). Then, at step 8, at the compiler 510, all global symbols that are not in the preserve list are localized to the current module. In prior approaches, symbols could be localized, but in the present disclosure, the preserve list has full symbol information and a dependency graph that allows more aggressive optimizations by the compiler 510.

Next, at step 9, the compiler 520 performs global optimization to the whole file scope. These optimizations are performed in view of the assigned output sections for each symbol. If, for some reason, a normal optimization that would be performed by the compiler 520 at this stage would violate the intended output section assignment as dictated by the linker script, the optimization is not performed, which is one advantage of the present disclosure. An additional advantage to the compiler 510 having all the output section assignments at this stage is that additional optimizations become available because of the output section information.

Next, at step 10, machine specific code generation is performed. During this step, the compiler assigns every symbol to a specific section, as required by ELF standards. As a result of the linker script output section assignment, all local symbols are assigned to their final output sections. All global symbols, however, are assigned to their default sections, as also required by ELF standards. Then, at step 11, the original symbol scope is restored. Previously localized symbols and any global symbols that were not eliminated during optimization are restored back to global scope. At step 12, one or more object files are generated by the compiler 510. These object files are then passed to the linker, as represented by the arrow between steps 12 and 13. At step 13, the final linking starts and results in the final executable image being created.

The solution of the present disclosure provides a number of advantages. First and foremost, it provides a way to utilize a linker script in an LTO tool flow, which was not previously possible. The interaction that is made possible by the present solution between the components of the LTO tool flow did not previously exist because it was complex for the linker and compiler to interact. For example, a "positive feedback loop" effect between the linker and compiler made interactions difficult. Another reason interaction between the linker and the compiler was difficult was because in previous approaches, the compiler was not aware of what steps would subsequently be taken or performed by the linker on the code produced by the compiler. The complexity of making the compiler aware of what the linker would do with compiled machine code had previously been deemed impractical. In the present solution, APIs between the compiler and linker allow for communication between the two entities, and algorithms for achieving the communication functionality provide the benefit of being able to perform LTO in the presence of a linker script. Furthermore, the use of resolved output section information allows the linker script to be used during both classical and IPO (Inter Procedural Optimizations). This resolved section information allows additional IPO optimizations that are not possible without it.

Figure 7:
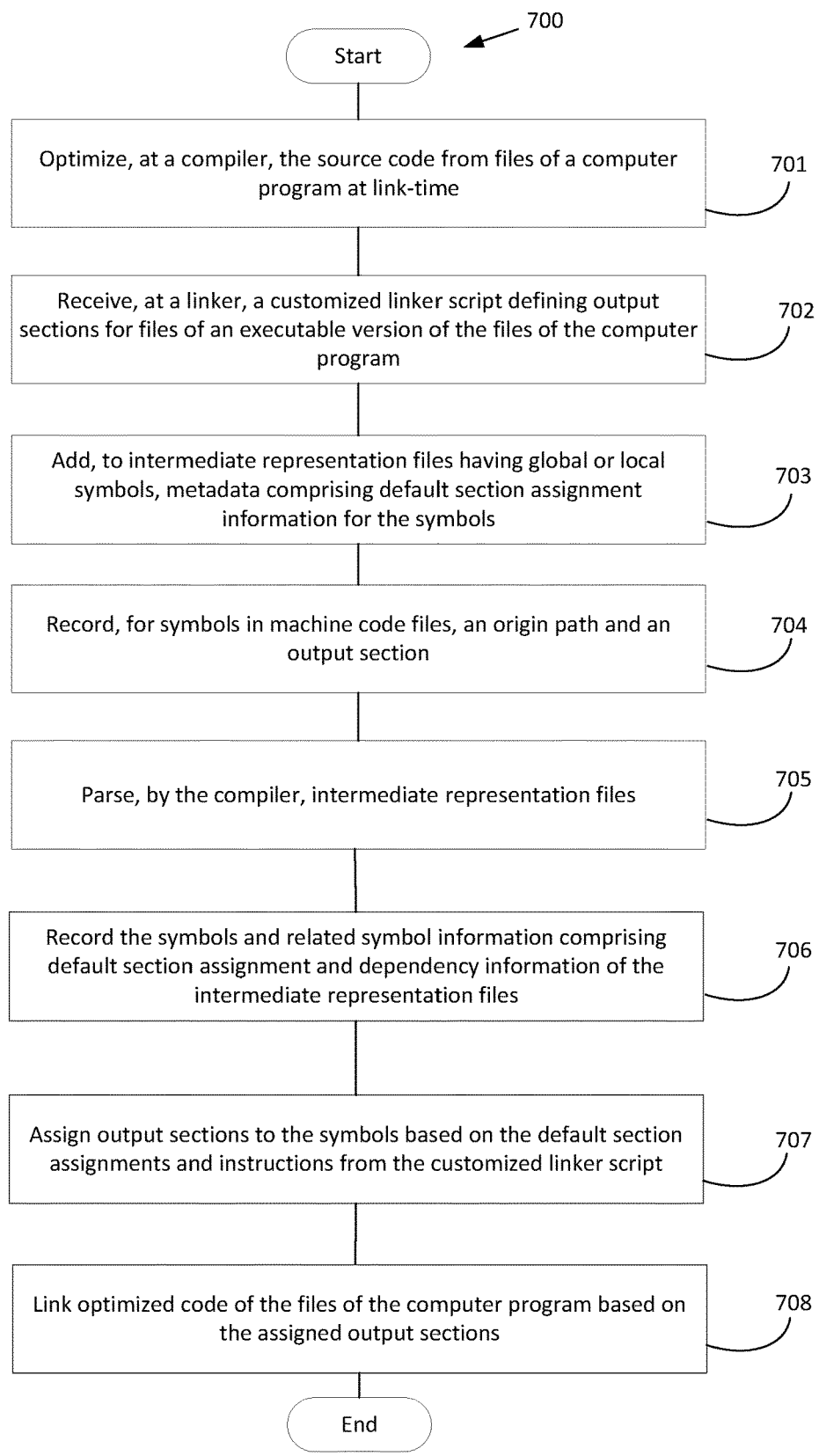
FIG. 7 is a flowchart of a method which may be traversed to perform an embodiment of the present disclosure.

FIG. 7 is a flowchart which may be traversed to implement a method 700 of code optimization.

Figure 6:
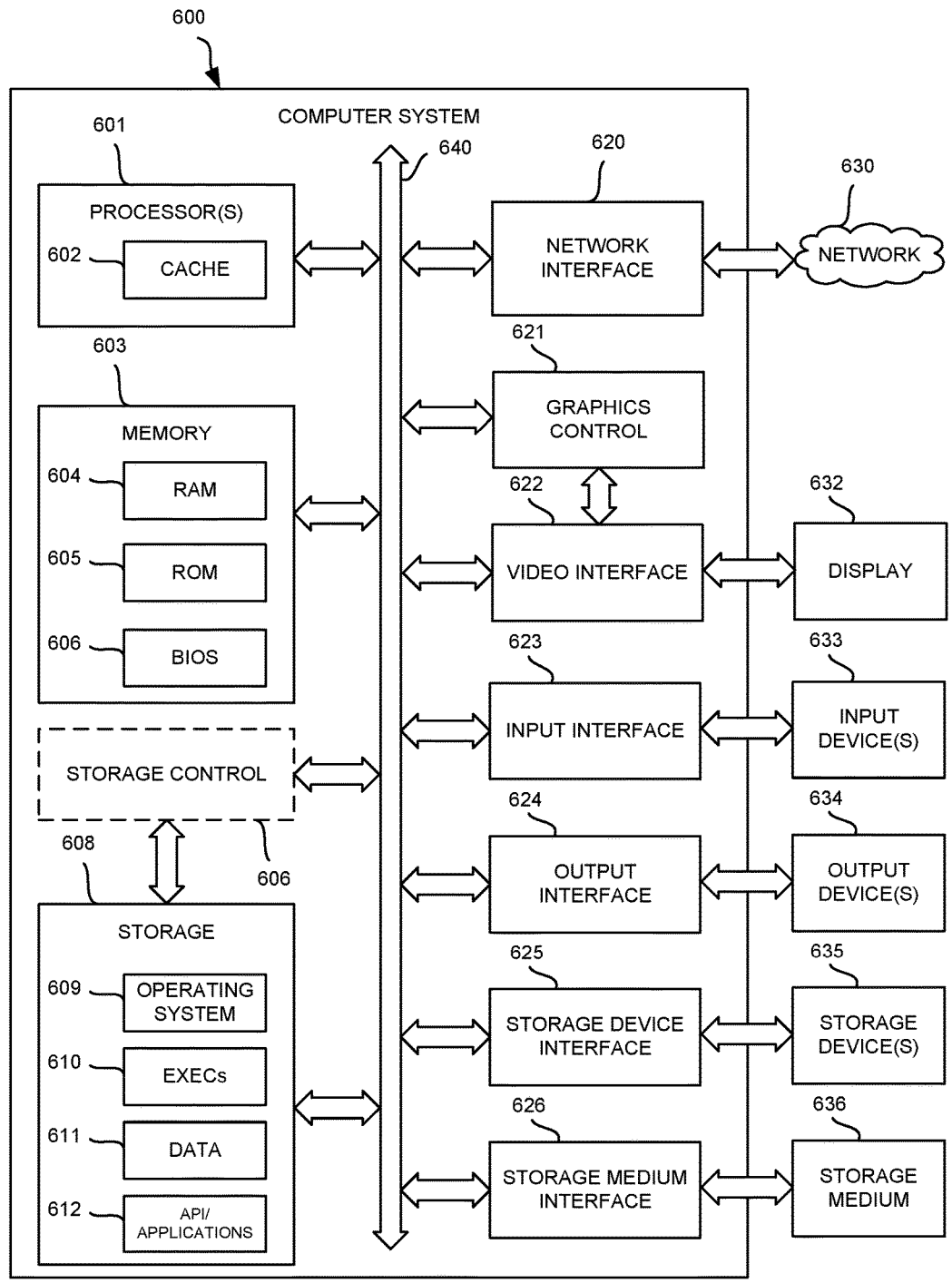
FIG. 6 is a hardware diagram of a computing device that may implement aspects of the present disclosure.

Referring next to FIG. 6, it is a block diagram depicting an exemplary machine that includes a computer system 600 within which a set of instructions can execute for causing a device to perform or execute any one or more of the aspects and/or methodologies for static code scheduling of the present disclosure. The components in FIG. 4 are examples only and do not limit the scope of use or functionality of any hardware, software, embedded logic component, or a combination of two or more such components implementing particular embodiments.

Computer system 600 may include a processor 601, a memory 603, and a storage 608 that communicate with each other, and with other components, via a bus 640. The bus 640 may also link a display 632, one or more input devices 633 (which may, for example, include a keypad, a keyboard, a mouse, a stylus, etc.), one or more output devices 634, one or more storage devices 635, and various tangible storage media 636. All of these elements may interface directly or via one or more interfaces or adaptors to the bus 640. For instance, the various tangible storage media 636 can interface with the bus 640 via storage medium interface 626. Computer system 600 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Processor(s) 601 (or central processing unit(s) (CPU(s))) optionally contains a cache memory unit 602 for temporary local storage of instructions, data, or computer addresses. Processor(s) 601 are configured to assist in execution of computer readable instructions. Computer system 600 may provide functionality for the components depicted in FIG. 1 as a result of the processor(s) 601 executing non-transitory processor-executable instructions embodied in one or more tangible computer-readable storage media, such as memory 603, storage 608, storage devices 635, and/or storage medium 636. The computer-readable media may store software that implements particular embodiments, and processor(s) 601 may execute the software. Memory 603 may read the software from one or more other computer-readable media (such as mass storage device(s) 635, 636) or from one or more other sources through a suitable interface, such as network interface 620. The software may cause processor(s) 601 to carry out one or more processes or one or more steps of one or more processes described or illustrated herein. Carrying out such processes or steps may include defining data structures stored in memory 603 and modifying the data structures as directed by the software.

The memory 603 may include various components (e.g., machine readable media) including, but not limited to, a random access memory component (e.g., RAM 604) (e.g., a static RAM "SRAM", a dynamic RAM "DRAM, etc.), a read-only component (e.g., ROM 605), and any combinations thereof. ROM 605 may act to communicate data and instructions unidirectionally to processor(s) 601, and RAM 604 may act to communicate data and instructions bidirectionally with processor(s) 601. ROM 605 and RAM 604 may include any suitable tangible computer-readable media described below. In one example, a basic input/output system 606 (BIOS), including basic routines that help to transfer information between elements within computer system 600, such as during start-up, may be stored in the memory 603.

Fixed storage 608 is connected bidirectionally to processor(s) 601, optionally through storage control unit 607. Fixed storage 608 provides additional data storage capacity and may also include any suitable tangible computer-readable media described herein. Storage 608 may be used to store operating system 609, EXECs 610 (executables), data 611, API applications 612 (application programs), and the like. Often, although not always, storage 608 is a secondary storage medium (such as a hard disk) that is slower than primary storage (e.g., memory 603). Storage 608 can also include an optical disk drive, a solid-state memory device (e.g., flash-based systems), or a combination of any of the above. Information in storage 608 may, in appropriate cases, be incorporated as virtual memory in memory 603.

In one example, storage device(s) 635 may be removably interfaced with computer system 600 (e.g., via an external port connector (not shown)) via a storage device interface 625. Particularly, storage device(s) 635 and an associated machine-readable medium may provide nonvolatile and/or volatile storage of machine-readable instructions, data structures, program modules, and/or other data for the computer system 600. In one example, software may reside, completely or partially, within a machine-readable medium on storage device(s) 635. In another example, software may reside, completely or partially, within processor(s) 601.

Bus 640 connects a wide variety of subsystems. Herein, reference to a bus may encompass one or more digital signal lines serving a common function, where appropriate. Bus 640 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 600 may also include an input device 633. In one example, a user of computer system 600 may enter commands and/or other information into computer system 600 via input device(s) 633. Examples of an input device(s) 633 include, but are not limited to, an alpha-numeric input device (e.g., a keyboard), a pointing device (e.g., a mouse or touchpad), a touchpad, a joystick, a gamepad, an audio input device (e.g., a microphone, a voice response system, etc.), an optical scanner, a video or still image capture device (e.g., a camera), and any combinations thereof. Input device(s) 633 may be interfaced to bus 640 via any of a variety of input interfaces 623 (e.g., input interface 623) including, but not limited to, serial, parallel, game port, USB, FIREWIRE, THUNDERBOLT, or any combination of the above.

In particular embodiments, when computer system 600 is connected to network 630, computer system 600 may communicate with other devices, specifically mobile devices and enterprise systems, connected to network 630. Communications to and from computer system 600 may be sent through network interface 620. For example, network interface 620 may receive incoming communications (such as requests or responses from other devices) in the form of one or more packets (such as Internet Protocol (IP) packets) from network 630, and computer system 600 may store the incoming communications in memory 603 for processing. Computer system 600 may similarly store outgoing communications (such as requests or responses to other devices) in the form of one or more packets in memory 603 and communicated to network 630 from network interface 620. Processor(s) 601 may access these communication packets stored in memory 603 for processing.

Examples of the network interface 620 include, but are not limited to, a network interface card, a modem, and any combination thereof. Examples of a network 630 or network segment 630 include, but are not limited to, a wide area network (WAN) (e.g., the Internet, an enterprise network), a local area network (LAN) (e.g., a network associated with an office, a building, a campus or other relatively small geographic space), a telephone network, a direct connection between two computing devices, and any combinations thereof. A network, such as network 630, may employ a wired and/or a wireless mode of communication. In general, any network topology may be used.

Information and data can be displayed through a display 632. Examples of a display 632 include, but are not limited to, a liquid crystal display (LCD), an organic liquid crystal display (OLED), a cathode ray tube (CRT), a plasma display, and any combinations thereof. The display 632 can interface to the processor(s) 601, memory 603, and fixed storage 608, as well as other devices, such as input device(s) 633, via the bus 640. The display 632 is linked to the bus 640 via a video interface 622, and transport of data between the display 632 and the bus 640 can be controlled via the graphics control 621.

In addition to a display 632, computer system 600 may include one or more other peripheral output devices 634 including, but not limited to, an audio speaker, a printer, and any combinations thereof. Such peripheral output devices may be connected to the bus 640 via an output interface 624. Examples of an output interface 624 include, but are not limited to, a serial port, a parallel connection, a USB port, a FIREWIRE port, a THUNDERBOLT port, and any combinations thereof.

In addition or as an alternative, computer system 600 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a computer-readable medium may encompass a circuit (such as an IC) storing software for execution, a circuit embodying logic for execution, or both, where appropriate. The present disclosure encompasses any suitable combination of hardware, software, or both.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for optimizing source code, the method comprising:
   optimizing, at a compiler, the source code from files of a computer program at link-time;
   receiving, at a linker, a customized linker script, wherein the customized linker script is provided by an embedded application developer and overrides a default linker script existing within the linker, the customized liker script defining output sections for files of an executable version of the files of the computer program;

adding, by the compiler, to intermediate representation files having global or local symbols, metadata comprising default section assignment information for the symbols;

recording, by the linker, for symbols in machine code files, an origin path and an output section;

sending, from the linker to the compiler, detailed global scope and use information, then;

parsing, by the compiler, based on a request and the detailed global scope and use information from the linker, the intermediate representation files;

recording, by the compiler, the symbols and related symbol information comprising the default section assignment information and dependency information of the intermediate representation files, then;

assigning output sections to the symbols based on both the default section assignment information and instructions from the customized linker script; and linking optimized code of the files of the computer program based on the assigned output sections.

2. The method of claim 1, wherein the method further comprises:
updating, at the linker, the dependency information of all the symbols.

3. The method of claim 1, wherein the method further comprises:
merging, at the compiler, parsed intermediate representation files, once all modules of a particular scope are received.

4. The method of claim 1, wherein the method further comprises:
generating a preserve list based on the dependency information.

5. The method of claim 1, wherein the method further comprises:
localizing any global symbols of a complete scope to a current module being compiled.

6. The method of claim 1, wherein the method further comprises:
optimizing, at the compiler, each of the intermediate representation files based on the output section information for each symbol associated with the intermediate representation files.

7. The method of claim 1, wherein the method further comprises:
restoring symbols to global scope.

8. A system for optimizing source code, the system comprising:
a processor and a memory configured to implement a linker and a compiler arranged in a link-time optimization tool flow to produce a link-time optimized executable computer program;
a customized linker script, wherein the customized linker script is provided by an embedded application developer and overrides a default linker script existing within the linker, and wherein the customized liker script instructs the linker how to arrange output sections in the link-time optimized executable computer program; and
an application program interface that enables communication between the linker and compiler and configured to facilitate the arrangement of the output sections of the link-time optimized executable according to the customized linker script, wherein the linker, compiler, and application program interface are configured to perform a method comprising:

adding, by the compiler, to intermediate representation files having global or local symbols, metadata comprising default section assignment information for the symbols;

recording, by the linker, for symbols in machine code files, an origin path and an output section;

sending, from the linker to the compiler, detailed global scope and use information, then;

parsing, by the compiler, based on a request and the detailed global scope and use information from the linker via the application program interface, the intermediate representation files;

recording, by the compiler, the symbols and related symbol information comprising the default section assignment information and dependency information of the intermediate representation files, then;

assigning output sections to the symbols based on both the default section assignment information and instructions from the customized linker script; and linking optimized code of the files of the computer program based on the assigned output sections.

9. The system of claim 8, wherein the method further comprises:
updating, at the linker, the dependency information of all the symbols.

10. The system of claim 8, wherein the method further comprises:
merging, at the compiler, parsed intermediate representation files, once all modules of a particular scope are received.

11. The system of claim 8, wherein the method further comprises:
generating a preserve list based on the dependency information.

12. The system of claim 8, wherein the method further comprises:
localizing global symbols of a complete scope to a current module being compiled.

13. The system of claim 8, wherein the method further comprises:
optimizing, at the compiler, each of the intermediate representation files based on the output section information for each symbol associated with the intermediate representation files.

14. The system of claim 8, wherein the method further comprises:
restoring symbols to global scope.

15. A non-transitory, tangible computer readable storage medium, encoded with processor readable instructions to perform a method for:
optimizing, at a compiler, the source code of files of a computer program at link-time;
receiving, at a linker, a customized linker script, wherein the customized linker script is provided by an embedded application developer and overrides a default linker script existing within the linker, the customized liker script defining output sections for files of an executable version of the files of the computer program;
adding, by the compiler, to intermediate representation files having global or local symbols, metadata comprising default section assignment information for the symbols;
recording, by the linker, for symbols in machine code files, an origin path and an output section;

sending, from the linker to the compiler, detailed global scope and use information, then;

parsing, by the compiler, based on a request and the detailed global scope and use information from the linker, the intermediate representation files;

recording, by the compiler, the symbols and related symbol information comprising the default section assignment information and dependency information of the intermediate representation files, then;

assigning output sections to the symbols based on both the default section assignment information and instructions from the customized linker script; and linking optimized code of the files of the computer program based on the assigned output sections.

16. The non-transitory, tangible computer readable storage medium of claim 15, wherein the method includes:

updating, at the linker, the dependency information of all the symbols.

17. The non-transitory, tangible computer readable storage medium of claim 15, wherein the method includes:

merging, at the compiler, parsed intermediate representation files, once all modules of a particular scope are received.

18. The non-transitory, tangible computer readable storage medium of claim 15, wherein the method includes:

generating a preserve list based on the dependency information.

19. The non-transitory, tangible computer readable storage medium of claim 15, wherein the method includes:

localizing global symbols of a complete scope to a current module being compiled.

20. The non-transitory, tangible computer readable storage medium of claim 15, wherein the method includes:

optimizing, at the compiler, each of the intermediate representation files based on the output section information for each symbol associated with the intermediate representation files.

* * * * *